United States Patent [19]
Zhang

[11] Patent Number: 5,940,224
[45] Date of Patent: Aug. 17, 1999

[54] WIDE BAND INFRARED CAMERA LENS SYSTEMS

[75] Inventor: Shiyu Zhang, Redwood City, Calif.

[73] Assignee: Nikon Corporation, Tokyo, Japan

[21] Appl. No.: 09/042,496

[22] Filed: Mar. 16, 1998

[51] Int. Cl.[6] ................................................ G02B 13/04
[52] U.S. Cl. ............................................. 359/749; 359/350
[58] Field of Search .................................. 359/749, 750, 359/751, 752, 753, 680, 681, 682, 350, 355, 356, 357

[56] References Cited

U.S. PATENT DOCUMENTS

| | | | |
|---|---|---|---|
| 4,383,727 | 5/1983 | Rogers | 350/1.3 |
| 4,521,068 | 6/1985 | Schulte in den Baumen | 350/1.1 |
| 4,600,265 | 7/1986 | Norrie | 350/1.3 |
| 4,679,891 | 7/1987 | Roberts | 350/1.3 |
| 4,738,496 | 4/1988 | Canzek | 350/1.3 |
| 4,871,219 | 10/1989 | Cooper | 350/1.4 |
| 4,989,962 | 2/1991 | Kebo | 350/537 |
| 4,999,005 | 3/1991 | Cooper | 350/1.4 |
| 5,142,417 | 8/1992 | Brunn | 359/859 |
| 5,193,025 | 3/1993 | Carlson et al. | 359/356 |
| 5,194,986 | 3/1993 | Carlson et al. | 359/353 |
| 5,305,138 | 4/1994 | Freedenberg et al. | 359/355 |
| 5,331,470 | 7/1994 | Cook | 359/859 |
| 5,379,157 | 1/1995 | Wang | 359/861 |

FOREIGN PATENT DOCUMENTS

| | | | |
|---|---|---|---|
| 297 520 A5 | 8/1989 | Germany . | |
| 61-219015 | 9/1986 | Japan | G02B 13/14 |
| 3-44612 | 2/1991 | Japan | G02B 15/14 |
| 7-311346 | 11/1995 | Japan | G02B 23/00 |

*Primary Examiner*—Hung Xuan Dang
*Attorney, Agent, or Firm*—H. Donald Nelson; Joseph T. FitzGerald

[57] ABSTRACT

Lens systems for wide band infrared camera having a bandwidth of 1–5 μm with a low f-number and 100% cold stop efficiency.

16 Claims, 4 Drawing Sheets

WIDE BAND INFRARED CAMERA LENS SYSTEMS

1. Field of the Invention

This invention relates generally to lens systems for infrared cameras. More specifically, this invention relates to lens systems for infrared cameras having a bandwidth from a wavelength of 1 μm to 5 μm, having 100% cold stop efficiency and having a low F-number.

2. Background of the Invention

Infrared cameras are well known in the optical art. However, the lens systems for prior art infrared cameras have serious limitations such as being limited in bandwidth and speed. An accurate detection of infrared signals from an object yields a large amount of critical information about the object. The wider the spectral response of the infrared optical system, the more information obtained from the object.

Some prior art infrared cameras utilize catoptric or catadioptric lens systems to correct the chromatic aberrations introduced by the lens system necessary to cover a wide spectral band. However, these lens systems have obscuration such as the lens system disclosed in U.S. Pat. No. 4,521,068 to Schulte in den Baumen. Others have a limited field of view or the systems are not fast enough, such as the systems disclosed in U.S. Pat. No. 5,142,417 to Brunn, U.S. Pat. No. 5,331,470 to Cook, and U.S. Pat. No. 5,379,157 to Wang.

Furthermore, some applications require lens systems that operate over a wide spectral band, have a fast response (small F-number) and have 100% cold shield efficiency. Typically, refractive lens systems are needed to satisfy these requirements.

Other techniques, such as the utilization of a holographic optical element (HOE) for the wide spectral band is inappropriate because of the low diffraction efficiency afforded by these techniques over the desired spectral region.

The prior art refractive lens systems that operate in the infrared spectral band are generally restricted to the mid-infrared range (3–5 cm) or the far-infrared (8–12 μm). Efforts have been made to expand the spectral response of such systems to a wider band, such as the 3–12 μm band as disclosed in U.S. Pat. No. 4,871,219 to Cooper, U.S. Pat. No. 4,999,005 to Cooper and U.S. Pat. No. 4,989,962 to Kebo. However, the prior art systems do not include the spectral range from 1–5 μm.

There is interest for lens systems having spectral bandwidths in the near-infrared (NIR) and mid-infrared (1–5 μm). Air has a reasonable transmission over much of the mid-infrared band. For instance, air has a reasonable transmission over 1–1.3 μm, 1.5–1.8 μm, 2.0–2.4 μm and 3–5 μm. In addition, some infrared detectors, such as platinum silicide (PtSi), have reasonably high response over the range of the spectral band of 1–5 μm. However, because of the high non-linear dispersion of available optical materials, the correction of chromatic aberration is very difficult. Prior art optical systems operating in the spectral range of 1–5 μm utilize spectral filters to discard the information from the 1–3 μm band. In order to take full advantage of infrared detectors, infrared optics operating in the spectral range of 1–5 μm are needed.

In addition, there are very few suitable optical materials usable over the spectral band of 1–5 μm. Materials such as AMTIR-1, calcium fluoride ($CaF_2$), cesium iodide (CsI), magnesium oxide (MgO), sapphire, and zinc selenide have acceptable optical transmission in the 1–5 μm range, however CsI is physically unstable and MgO has good optical properties but is very expensive.

Accordingly, there is a need for lens systems for infrared cameras that operate in the spectral bandwidth of wavelengths from 1–5 μm with selected lens element materials to correct chromatic aberration, with a low F-number and that have 100% cold shield efficiency.

SUMMARY OF THE INVENTION

Lens systems for wide band infrared cameras in accordance with the present invention solve the above and other problems associated with conventional lens systems for infrared cameras. The above and other objects and advantages of the present invention are attained through lens systems for wide band infrared cameras that have operate in the spectral bandwidth having wavelengths from 1–5 μm with a low F-number and with adequate chromatic aberration correction. In addition, the lens systems in accordance with the present invention have the lens system aperture stop coincident with the cold stop that provides 100% cold stop efficiency.

In a first embodiment of the present invention, a 45 millimeter EFL lens system is composed of a first group of lens elements and a second group of lens elements. The first group of lens elements and the second group of lens elements are independently movable along the optical axis of the lens system to provide refocusing for different object distances.

In a second embodiment of the present invention, a 100 millimeter EFL lens system is composed of three groups of lens elements. The second and third groups of lens elements are movable along the optical axis of the lens system to provide focusing for different object distances.

The lens systems of the present invention have a wide bandwidth from at least 1–5 μm and an aperture stop that coincides with the cold stop of the lens system thus providing 100% cold stop efficiency. In addition, the lens systems of the present invention are fast systems with low F-numbers and minimal chromatic aberrations. The lens systems are simple, thus having lower manufacturing costs, lower material costs and lower system weight.

These and other advantages of the present invention will become more apparent upon a reading of the detailed description of the preferred embodiments that follow, when considered in conjunction with the drawings of which the following is a brief description. It should be clear that the drawings are merely illustrative of the currently preferred embodiments of the present invention, and that the invention is in no way limited to the illustrated embodiments. As will be realized, the invention is capable of other embodiments and its several details are capable of modifications in various obvious aspects, all without departing from the scope of the invention. The present invention is best defined by the claims appended to this specification.

BRIEF DESCRIPTION OF THE DRAWINGS

The novel features believed characteristic of the invention are set forth in the appended claims. The invention itself, however, as well as preferred modes of use, and further objects and advantages thereof, will best be understood by reference to the following detailed description of an illustrative embodiments when read in conjunction with the accompanying drawings, wherein:

DETAILED DESCRIPTION

Figure 1:
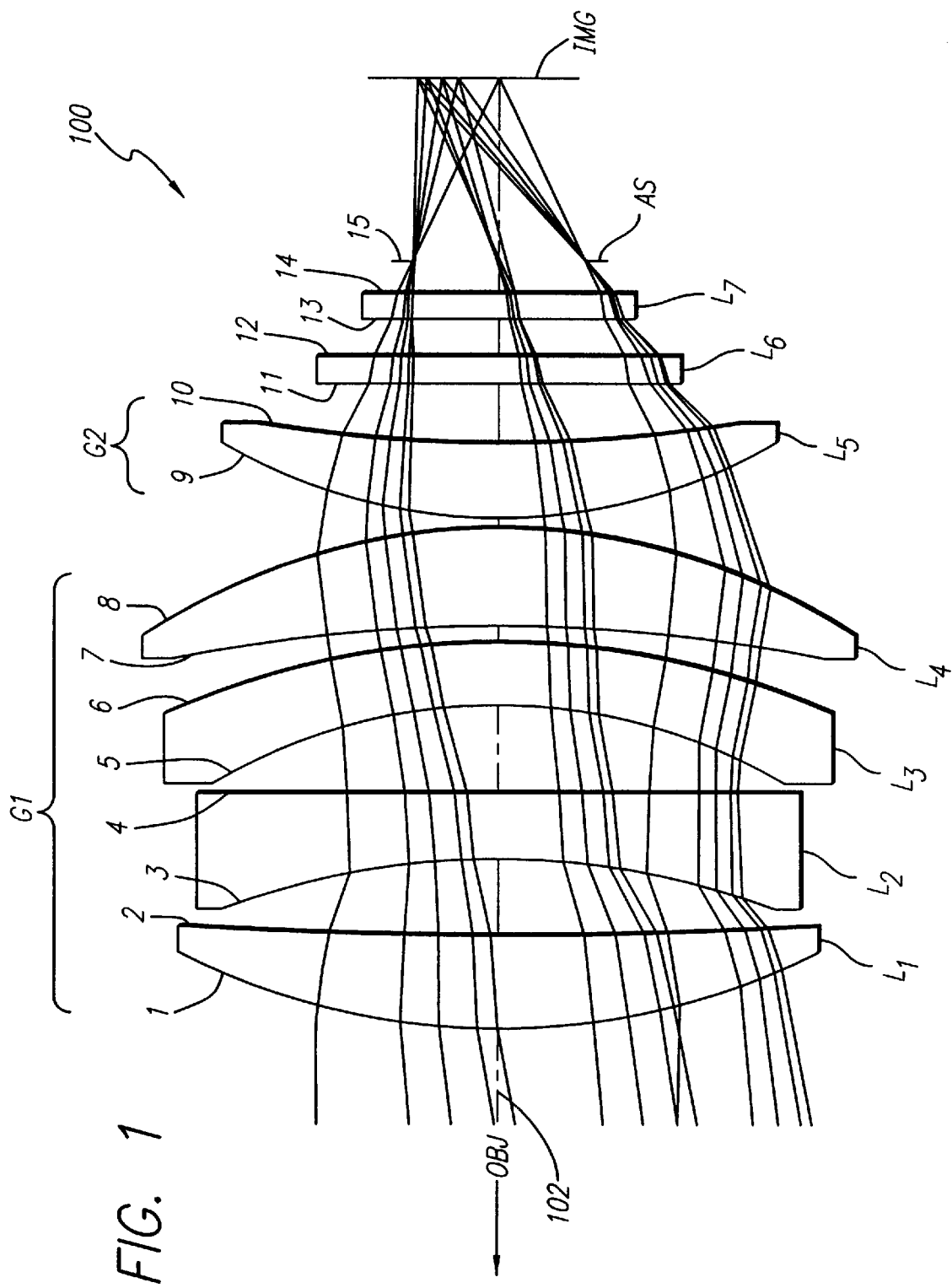
FIG. 1 is a schematic diagram of a 45 millimeter EFL lens system for wide band infrared cameras.

The following detailed description is of the presently preferred embodiments of the present invention. It is to be understood that while the detailed description is given utilizing the drawings briefly described above, the invention is not limited to the illustrated embodiments. In the detailed description, like reference numbers refer to like elements.

Referring now to the Figures, two embodiments of the present invention will now be described. According to standard practice in the optical art, drawings of optical lens systems, such as those shown in the figures, have the object space, defined as all the space from the first element of surface of a system towards the object and beyond, on the left in the drawing. Similarly, the image space, defined as all the space from the last element or surface of a system towards the image and beyond, is on the right in the drawings. Each lens element is identified alphanumerically and each optical element surface is sequentially identified numerically from the object side to the image side. It is noted that the term "group of lens elements" includes a group of lens elements composed of a single lens element.

Referring to FIG. 1, there is shown a 45 millimeter EFL (effective focal length) lens system 100 for a wide band infrared camera in accordance with the present invention. The lens system 100, viewed from the object side, in order of succession, includes a first group of lens elements $G_1$, a second group of lens elements $G_2$ and an aperture stop AS.

The first group of lens elements $G_1$ is composed of: viewed from the object side, in order of succession is composed of: a positive lens element $L_1$ made of zinc sulfide with a convex lens surface 1 facing the object side and a concave lens surface 2 facing the image side, a negative lens element $L_2$ made of amtir1 (amtir is an acronym for "amorphous material transmitting infrared radiation"—the specifications of the amtir1 can be found in documentation available from Amorphous Materials, Inc. 3130 Benton Street, Garland, Tex. 75042), with a stronger concave lens surface 3 facing the object side and a concave lens surface 4 facing the image side, a negative lens element $L_3$ made of sapphire having a concave lens surface 5 facing the object side and a convex lens surface 6 facing the image side, and a positive lens element $L_4$ made of zinc sulfide with a concave lens surface 7 facing the object side and with an aspherical lens surface 8 facing the image side.

The second group of lens elements $G_2$ is composed of a positive lens element $L_5$ made of zinc sulfide with a convex lens surface 9 facing the object side and a concave lens surface 10 facing the image side. A spectral filter $L_6$ and a Dewar window L7 are disposed between the second group of lens elements $G_2$ and the aperture stop AS 15. The spectral filter $L_6$ is replaceable in order to select the portion of the spectral band in which the signal to be detected is within. The aperture stop AS 15 coincides with the cold stop of the lens system 100. The first and second group of lens elements $G_1$ and $G_2$ are movable along the optical axis 102.

The lens system 100 satisfies the following conditions:

$1.7 < f_1/f < 5.0$, and $1.1 < f_2/f < 2.2$, where $f_1$ is the focal length of the first group of lens elements, $f_2$ is the focal length of the second group of lens elements and f is the effective focal length of the lens system 100.

Figure 2:
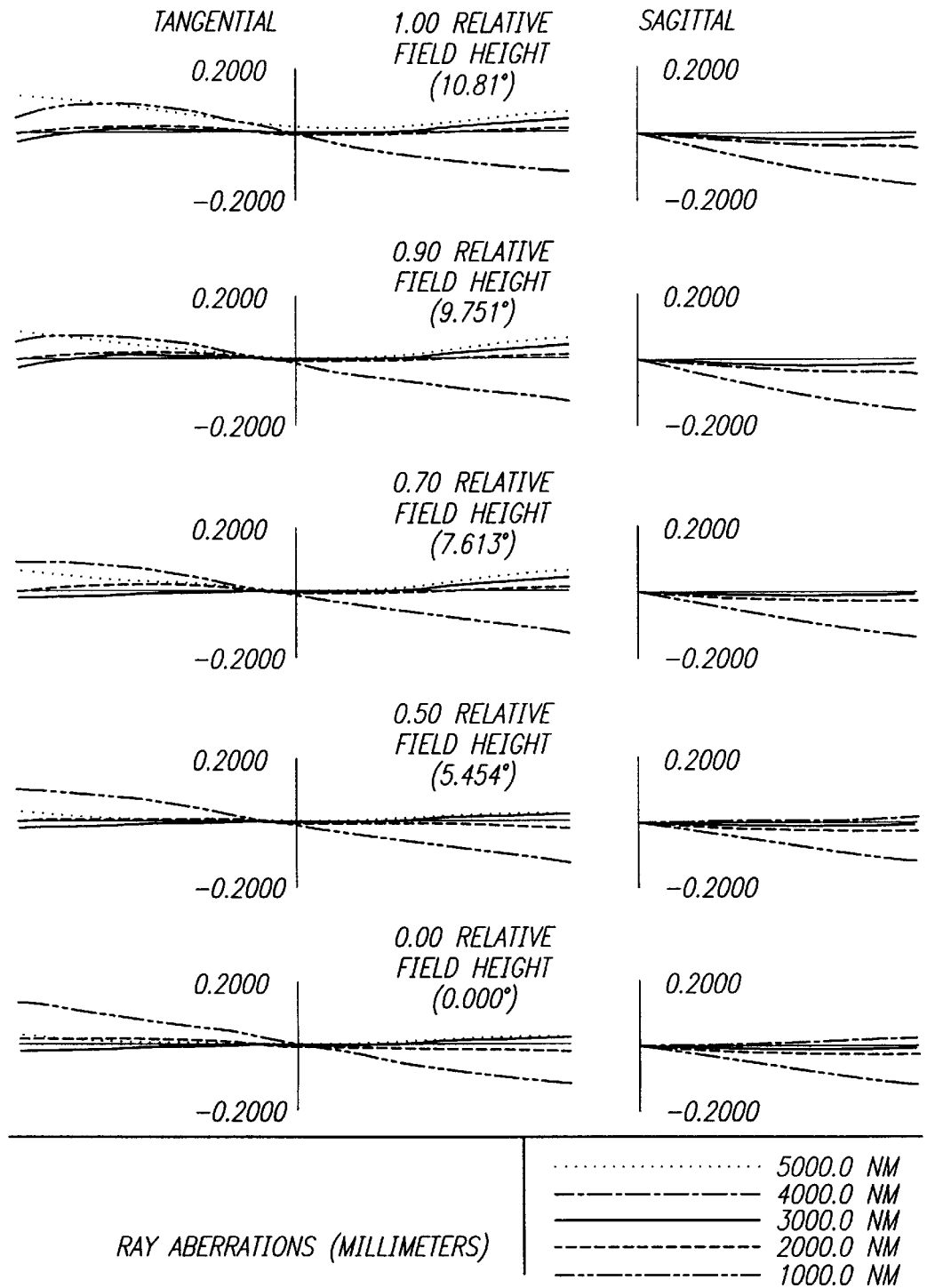
FIG. 2 shows the ray aberrations of the lens system shown in FIG. 1 for varying relative field heights for wavelengths of 1 μm, 2 μm, 3 μm, 4 μm, and 5 μm.

FIG. 2 shows the ray aberrations of the lens system 100 shown in FIG. 1. As is known in the optical art, the aberration diagrams shown in FIG. 2 indicate how the image quality of the lens system can affect the intended purpose of the lens system. A determination of the aberration content of the lens system can be obtained from an examination of the ray intercept plots shown in FIG. 2. In the ray intercept plots, the ray displacements are plotted vertically as a function of the position of the ray in the aperture. The vertical scale is given at the lower end of the vertical bar for the axial plot and the number given is the half-length (i.e., from the origin to the end) of the vertical line in the plot. The horizontal scale is proportional to the tangent of the ray slope angle. In accordance with the usual convention, the upper ray of the ray fan is plotted to the right. The plotting of the data for 5 wavelengths gives a more complete understanding of the aberrations of the lens system.

TABLE 1 below shows the values of specifications for the lens system 100 shown in FIG. 1. Such a listing of the specifications for a lens system is also known as a lens prescription. The numbers in the leftmost column indicate the number of the optical surface sequentially from the object side to the image side. The second column is the radius of curvature in millimeters (a positive radius indicates the center of curvature is towards the right or image side and a negative radius indicates the center of curvature is towards the left or the object side). The third column is the axial distance in millimeters from the optical surface indicated in the first column to the next optical surface. The material from which the optical element is made is indicated in the rightmost column.

TABLE 1 f = 45 mm (EFL), $f_1$ = 130.670 mm, $f_2$ = 62.92. mm

| Surface number | Radius of curvature (mm) | Axial distance | Optical Material |
|---|---|---|---|
| OBJ | INFINITY | INFINITY | |
| 1 | 70.13469 | 10.361491 | zinc sulfide* |
| 2 | 428.74807 | 8.753630 | |
| 3 | −74.84234 | 7.000000 | amtir1 |
| 4 | 1119.61689 | 9.722352 | |
| 5 | −55.63345 | 7.000000 | sapphire |
| 6 | −80.09188 | 1.862852 | |
| 7 | −156.21943 | 10.699702 | zinc sulfide |
| 8** | −61.10130 | 1.277404 | |
| **Aspherical surface constants | | | |
| K = −0.540489  A = 0.0  B = −0.900348E−10 | | | |
| 9 | 54.69909 | 8.092913 | zinc sulfide |
| 10 | 164.07333 | 6.697354 | |
| 11 | INFINITY | 3.000000 | zinc sulfide |
| 12 | INFINITY | 4.000000 | |
| 13 | INFINITY | 3.000000 | zinc sulfide |
| 14 | INFINITY | 3.900000 | |
| 15 (AS) | INFINITY | 19.100000 | |
| IMG | INFINITY | 0.000000 | |

*The indices of refraction for the lens materials vary with wavelength. The indices of refraction for amtir1, sapphire and zinc sulfide versus wavelength are reproduced in TABLE 2. Further information for amtir1 can be obtained from the manufacturer, Amorphous Materials, Inc., as discussed above.

TABLE 2

| wavelength | index of refraction | wavelength | index of refraction |
|---|---|---|---|
| Indices of Refraction for amtirl. | | | |
| 5 μm | 2.510800 | 4 μm | 2.514200 |
| 3 μm | 2.518000 | 2 μm | 2.530600 |
| 1 μm | 2.605000 | | |
| Indices of Refraction for sapphire | | | |
| 5 μm | 1.624479 | 4 μm | 1.675088 |
| 3 μm | 1.711967 | 2 μm | 1.737655 |
| 1 μm | 1.755693 | | |
| Indices of Refraction for zinc sulfide | | | |
| 5 μm | 2.246610 | 4 μm | 2.252310 |
| 3 μm | 2.257720 | 2 μm | 2.265047 |
| 1 μm | 2.292647 | | |

Figure 3:
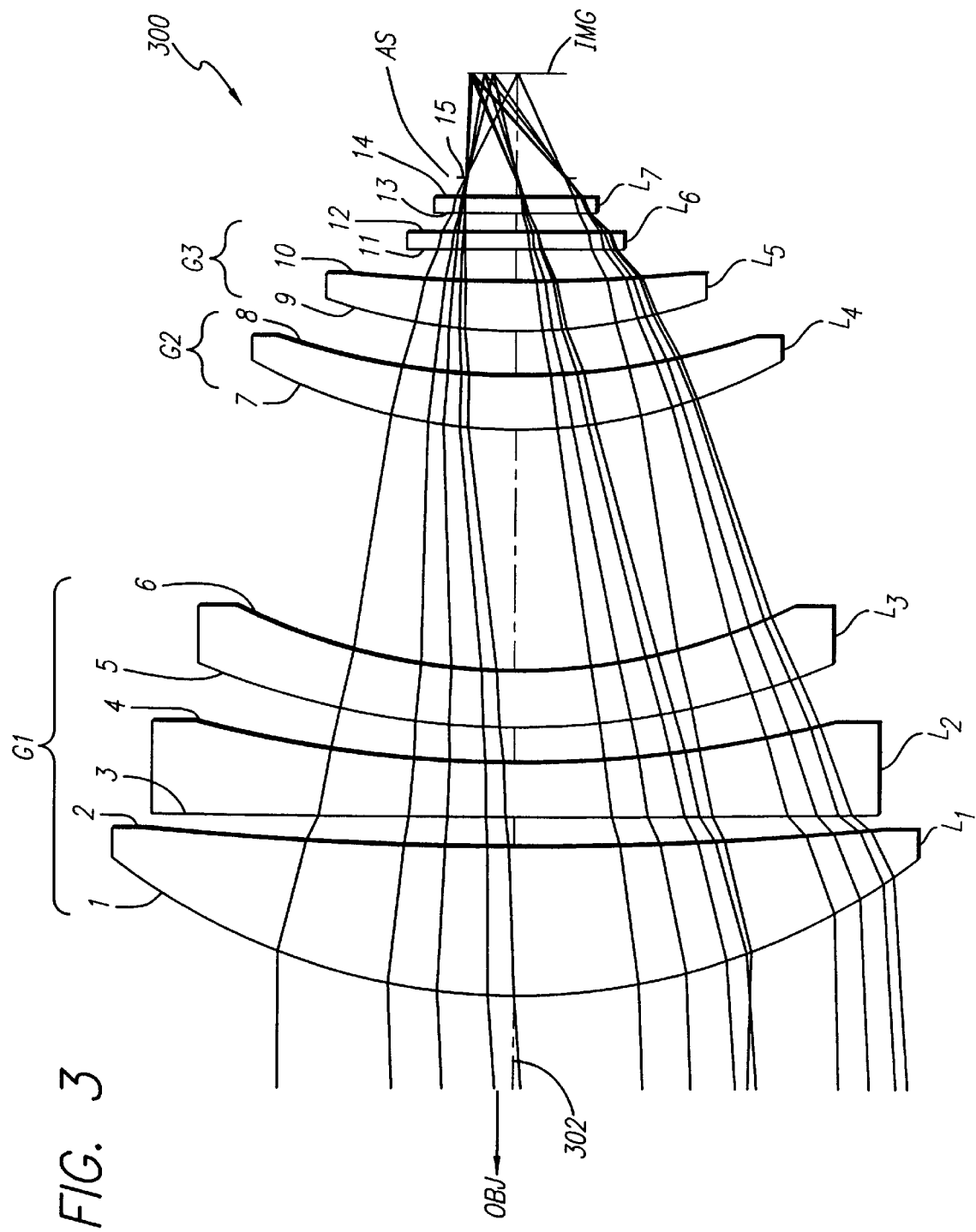
FIG. 3 is a schematic diagram of a 100 millimeter EFL lens system for wide band infrared cameras.

Referring to FIG. 3, there is shown a 100-millimeter EFL lens system 300 for a wide band infrared camera in accordance with the present invention. The lens system 300, viewed from the object side, in order of succession, includes a first group of lens elements $G_1$, a second group of lens elements $G_2$, a third group of lens elements $G_3$, and an aperture stop AS 15.

The first group of lens elements $G_1$, viewed from the object side, in order of succession is composed of: a positive lens element $L_1$ made of zinc sulfide with a convex aspherical lens surface 1 facing the object side and a concave lens surface 2 facing the image side, a negative lens element $L_2$ made of amtirl (for a definition of amtirl-see above) with a convex lens surface 3 facing the object side and a concave lens surface 4 facing the image side, and a negative lens element $L_3$ made of sapphire with a convex lens surface 5 facing the object side and a concave lens surface 6 facing the image side.

The second group of lens elements $G_2$ is composed of a positive lens element $L_4$ made of zinc sulfide with a convex aspherical lens surface 7 facing the object side and a concave lens surface 8 facing the image side. The second group of lens elements $G_2$ is movable along the optical axis 302.

The third group of lens elements is composed of a positive lens element $L_5$ made of zinc sulfide with a convex lens surface 9 facing the object side and a concave lens surface 10 facing the image side.

A spectral filter $L_6$ and a Dewar window $L_7$ is disposed between the third group of lens elements $G_3$ and the aperture stop AS 15. The spectral filter $L_6$ is replaceable in order to select the portion of the spectral band in which the signal to be detected is within. The aperture stop AS 15 coincides with the cold stop of the lens system 300 providing 100% cold stop efficiency.

The lens system 300 satisfies the following conditions:

$$2.1 < f_1/f < 11.0,$$

$$0.7 < f_2/f < 15.0,$$

$$0.6 < f_3/f < 8.0,$$

where $f_1$ is the focal length of the first group of lens elements, $f_2$ is the focal length of the second group of lens elements, $f_3$ is the focal length of the third group of lens elements and f is the effective focal length (EFL) of the lens system 300.

Figure 4:
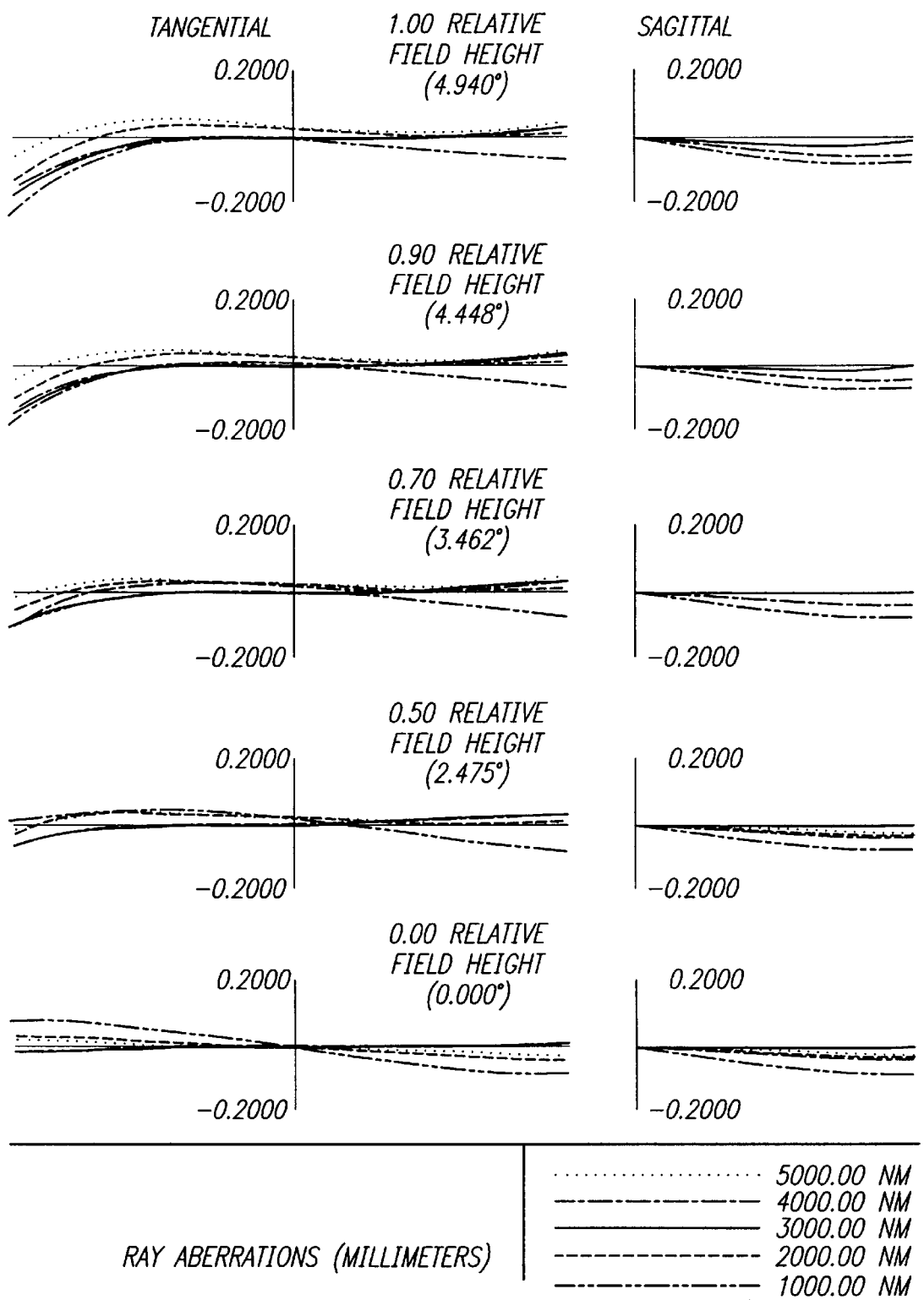
FIG. 4 shows the ray aberrations of the lens system shown in FIG. 3 for varying relative field heights for wavelengths of 1 μm, 2 μm, 3 μm, 4 μm, and 5 μm.

FIG. 4 shows the ray aberrations of the 100-millimeter lens system 300 shown in FIG. 3. The significance and use of the ray aberration diagrams is discussed above in conjunction with FIG. 2.

TABLE 3 below shows the values of specifications for the lens system 300 shown in FIG. 3. The parameters are described above in conjunction with TABLE 1.

TABLE 3 f = 100 mm (EFL), $f_1$ = 279.913 mm, $f_2$ = 200.070 mm, $f_3$ = 110.802 mm

| Surface number | Radius of curvature (mm) | Axial distance | Optical Material |
|---|---|---|---|
| OBJ | INFINITY | INFINITY | |
| 1** | 104.84783 | 28.300000 | zinc sulfide |
| **Aspherical surface constants | | | |
| K = −0.126163  A = 0.0  B = 0.0  C = 0.0 | | | |
| 2 | 605.71641 | 5.507107 | |
| 3 | 5790.06711 | 10.000000 | amtirl |
| 4 | 197.77724 | 7.099669 | |
| 5 | 134.42742 | 10.000000 | sapphire |
| 6 | 97.19013 | 45.264695 | |
| 7** | 81.69827 | 10.000000 | zinc sulfide |
| **Aspherical surface constants | | | |
| K = −0.628128  A = 0.0  B = 0.0  C = 0.0 | | | |
| 8 | 112.88156 | 9.057795 | |
| 9 | 99.68424 | 9.000000 | zinc sulfide |
| 10 | 334.80216 | 5.810309 | |
| 11 | INFINITY | 3.000000 | zinc sulfide |
| 12 | INFINITY | 4.000000 | |
| 13 | INFINITY | 3.000000 | zinc sulfide |
| 14 | INFINITY | 3.900000 | |
| 15 (AS) | INFINITY | 19.100000 | |
| IMG | INFINITY | 0.000000 | |

*As discussed above in conjunction with TABLE 1, the indices of refraction vary with wavelength. The indices of refraction for zinc sulfide and amtirl are reproduced in TABLE 2 above.

In summary, the advantages of the lens systems of the present invention can now be more fully realized. The lens systems of the present invention have a wide bandwidth from at least 1–5 μm and an aperture stop that coincides with the cold stop of the lens system thus providing 100% cold stop efficiency. In addition, the lens systems of the present invention are fast systems with low F-numbers and minimal chromatic aberrations. The lens systems are simple, thus having lower manufacturing costs, lower material costs and lower system weight.

The foregoing description of the embodiments of the invention has been presented for purposes of illustration and description. It is not intended to be exhaustive or to limit the invention to the precise form disclosed. Obvious modifications or variations are possible in light of the above teachings. The embodiments were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A lens system for a wide band infrared camera, comprising, in order from an object side to an image side:

a first group of lens elements;

a second group of lens elements; and an aperture stop that coincides with a cold stop of the lens system wherein the lens system has 100% cold stop efficiency; and wherein the lens system has a bandwidth of 1 μm to 5 μm.

2. The lens system of claim 1 wherein the lens system satisfies the following conditions:

$1.7 < f_1/f < 5.0$, and $1.1 < f_2/f < 2.2$, where $f_1$ is the focal length of the first group of lens elements, $f_2$ is the focal length of the second group of lens elements and f is the effective focal length of the lens system.

3. The lens system of claim 2 wherein the first group of lens elements comprises in order from the object side to the image side:

a first positive lens element;

a first negative lens element;

a second negative lens element; and a second positive lens element.

4. The lens system of claim 3 wherein the second group of lens elements comprises a positive lens element.

5. The lens system of claim 4 wherein:

the first positive lens element in the first group of lens elements has a convex lens surface facing the object side;

the first negative lens element in the first group of lens elements has a stronger concave lens surface facing the object side;

the second negative lens element in the first group of lens elements has a concave lens surface facing the object side; and the second positive lens element in the first group of lens elements has a concave lens surface facing the object side.

6. The lens system of claim 5 wherein the positive lens element in the second group of lens elements has a convex surface facing the object side.

7. The lens system of claim 6 wherein:

the first positive lens element in the first group of lens elements is made of zinc sulfide;

the first negative lens element in the first group of lens elements is made of amtir1;

the second negative lens element in the first group of lens elements is made of sapphire;

the second positive lens element in the first group of lens elements is made of zinc sulfide; and the positive lens element in the second group of lens elements is made of zinc sulfide.

8. The lens system of claim 1 wherein the lens system further comprises a third group of lens elements.

9. The lens system of claim 8 wherein the lens system satisfies the following conditions:

$2.1 < f_1/f < 11.0$, $0.7 < f_2/f < 15.0$, $0.6 < f_3/f < 8.0$, where $f_1$ is the focal length of the first group of lens elements, $f_2$ is the focal length of the second group of lens elements, $f_3$ is the focal length of the third group of lens elements and f is the effective focal length (EFL) of the lens system.

10. The lens system of claim 9 wherein the first group of lens elements comprises in order from the object side to the image side:

a positive lens element;

a first negative lens element; and a second negative lens element.

11. The lens system of claim 10 wherein the second group of lens elements comprises a positive lens element.

12. The lens system of claim 11 wherein the third group of lens elements comprises a positive lens element.

13. The lens system of claim 12 wherein:

the positive lens element in the first group of lens elements has a convex surface facing the object side;

the first negative lens element in the first group of lens elements has a convex surface facing the object side; and the second negative lens element in the first group of lens elements has a convex surface facing the object side.

14. The lens system of claim 13 wherein the positive lens element in the second group of lens elements has a convex surface facing the object side.

15. The lens system of claim 14 wherein the positive lens element in the third group of lens elements has a convex surface facing the object side.

16. The lens system of claim 15 wherein:

the positive lens element in the first group of lens elements is made of zinc sulfide;

the first negative lens element in the first group of lens elements is made of amtir1;

the second negative lens element in the first group of lens elements is made of sapphire.

the positive lens element in the second group of lens elements is made of zinc sulfide; and the positive lens element in the third group of lens elements is made of zinc sulfide.

* * * * *